United States Patent [19]
Meshinsky et al.

[11] Patent Number: 5,889,896
[45] Date of Patent: Mar. 30, 1999

[54] SYSTEM FOR PERFORMING MULTIPLE PROCESSES ON IMAGES OF SCANNED DOCUMENTS

[76] Inventors: John Meshinsky, 11920 Ledgerock Ct., Potomac, Md. 20854; James Hammond, 2100 Paul Edwin Terr., #304, Falls Church, Va. 22043; David Sherman, 417 S. Abington St., Arlington, Va. 22204; Thomas Sweeting, 102 Julian Ct., Greenbelt, Md. 20770; Stan Branche, 2130 P St. NW, Apt. 904, Washington, D.C. 20037; Kenneth Tighe, 6318 Newberg Dr., Bethesda, Md. 10816; Timothy Fleischer, 1501A N. 12th St., Arlington, Va. 22209

[21] Appl. No.: 365,605

[22] Filed: Dec. 27, 1994

(Under 37 CFR 1.47)

Related U.S. Application Data

[63] Continuation of Ser. No. 194,055, Feb. 9, 1994, abandoned.
[51] Int. Cl.$^6$ ........................................................ G06K 9/00
[52] U.S. Cl. .............................................. 382/305; 707/10
[58] Field of Search ............................. 382/305; 707/514, 707/10, 104

[56] References Cited

U.S. PATENT DOCUMENTS

| | | | |
|---|---|---|---|
| 4,817,050 | 3/1989 | Komatsu et al. | 382/305 |
| 4,888,812 | 12/1989 | Dinan et al. | 382/305 |
| 5,010,581 | 4/1991 | Kanno | 382/305 |
| 5,058,185 | 10/1991 | Morris et al. | 382/305 |
| 5,109,439 | 4/1992 | Froessl | 382/305 |
| 5,191,525 | 3/1993 | Le Brun et al. | 364/419 |
| 5,418,942 | 5/1995 | Krawchuk et al. | 707/3 |
| 5,457,780 | 10/1995 | Shaw et al. | 382/305 |

*Primary Examiner*—Yon J. Couso
*Attorney, Agent, or Firm*—Pollock, Vande Sande & Amernick

[57] ABSTRACT

A plurality of node index records are created in a database containing stored scanned image data and related index files. The node index records are batched in accordance with a hierarchy of documents from which they were derived. The index node records are stored in a work queue which is divided into stages. The first stage of the work queue includes a system administrator connected to the database which identifies a work flow comprising several processes to be carried out on the node index records and related image files. A plurality of workstations networked to the database carry out the work flow process and upon completion of each process, restores the index node records to a lower stage of the work queue where subsequent processes are carried out by the networked computer workstations.

11 Claims, 8 Drawing Sheets

| B1 | F1 | D1 | $I_1$ | $I_1$ | $I_1$ | $I_1$ | $I_1$TIF |
|----|----|----|----|----|----|----|----|
| B1 | F1 | D1 | $I_2$ | $I_2$ | $I_2$ | $I_2$ | $I_2$TIF |
| B1 | F1 | D1 | | | | | |
| B1 | F1 | D1 | | | | | |
| B1 | F1 | D1 | | | | | |
| B1 | F1 | D2 | | | | | |
| B1 | F1 | D2 | | | | | |
| B1 | F2 | D1 | | | | | |
| B1 | F2 | D1 | | | | | |
| B1 | F2 | D1 | | | | | |
| B2 | F1 | D1 | | | | | |
| B2 | F1 | D1 | $I_{12}$ | $I_{12}$ | $I_{12}$ | $I_{12}$ | $I_{12}$-TIF |

SYSTEM FOR PERFORMING MULTIPLE PROCESSES ON IMAGES OF SCANNED DOCUMENTS

This application is a continuation of U.S. Ser. No. 08/194,055, filed Feb. 9, 1994 now abandoned.

BACKGROUND OF THE INVENTION

The present invention relates to document imaging systems for storing and retrieving images of scanned documents. Specifically, the invention relates to the batch processing of raw image data which has been scanned into the memory of a processing system.

Document scanning to create electronic media from paper documents and microfilmed records is conducted on a high-speed, high-volume production basis. Electronic media offers advantages over print media in storage space efficiency, preservation. retrieval and text searching. High-speed scanners can rapidly scan 10,000 documents, creating a stored pixel-based image of each side of each scanned page. Each image is identified by an ASCII index file record which contains various indicia relating to the image. The index file record is created at the time of scanning and contains address links to respective document images. Personnel conducting a scanning operation include bar code data or other readable indicia on each page being imaged. Additionally, break pages may be included which identify the beginning and end of a document, folder or box. This information is inserted in the ASCII index file by the image scanner and is used to locate the linked image.

The Kodak Image Link scanning system produces an ASCII text file containing the readable indicia for each scanned page including the inserted break pages. The image data for each scanned image comprises a pixel array which is transferred with the related ASCII index file over a local area network for storage in a database in accordance with a protocol specified by the manufacturer of the scanner controller.

The images of the document residing in the data base of the processing system are accessed from information contained in the ASCII index file. A computer operator networked to the database controller can call up and search tile ASCII index file for a record or records which correspond to the image(s) which are to be retrieved for viewing on a retrieval device or for export to other devices which utilize the image data such as a CD ROM storage.

The stored image data may require further processing to correct for scanninig anomalies, such as image skew and image defects. Image skew can be corrected by rotating the pixel array, whereas poor image quality may require the document to be rescanned into the system.

The use of the stored images in text search and retrieval applications is limited by the content of the ASCII index files. For enhanced search and retrieval capabilities, the ASCII files must be augmented with information which is searchable. Improved searching capabilities may be realized if an OCR file is made of the image data and linked to the respective image. This permits full text search capabilities of the OCR version of the image.

The retrieval system which corrects the image errors and augments the index ASCII file does so on an image by image basis. A work station operator must call up each index file record and corresponding image on a per image/per index file record basis. The workload represented by these post scanning processes reduces the overall system throughput.

Batch processing of the stored image data and index file record can organize images and index file records so that only stored information which relates to a specific job is queued up for these additional processes. The capability of providing multiple computer work stations for performing different tasks on the same image records and index records also aids throughput. System throughput suffers when the images are subjected to tasks which are executed in sequence, requiring workstations which execute some tasks to wait until the earlier tasks of the sequence are executed.

A remaining problem in the document retrieval system is providing a format for the index file which is compatible with output devices of various users. Each manufacturer of these devices, has their own input format requirements. Thus, a transfer of information from the processed records to the input file of the retrieval device requires the ability to map records of one format to records of an input file having a different format.

SUMMARY OF THE INVENTION

The present invention provides distributed batch processing of scanned image files and index files. Scanned image files and index files are stored in a database. A computer workstation serving as a system administrator creates batches of the image file records and index file records on a job by job basis. The batches comprise sets and subsets of newly-created node index records linked to each image file record. The node index records include information imported from the ASCII text file as well as additional user entered information which further identifies the corresponding image record.

The batched node index records are stored in a work queue. The queue is divided into stages, corresponding to a sequence of tasks to be performed on the batched index records and their related image records. Computer workstations connected to the database controller may retrieve each of the batches from a stage and perform a given task on each job-related image file record and newly-created node index file record.

System throughput is enhanced by permitting a workstation to execute one task on a batch of node index file records and to return the modified index file records to the next stage of the work queue. The next task in the task sequence is executed by another computer workstation which retrieves the modified index file from the subsequent stage of the job queue. The twice-processed image index record is returned to the next lower stage of the work queue for further processing.

The task distribution among several workstations permits various enhancements to be made to the image file and newly-created node index file records. Author, title, abstract and other useful information not found in the original ASCII index file may be added in additional fields which were created in the node index file records by the system administrator. Skewed images can be corrected by a workstation operator who observes a skew, and image files having a quality which requires rescanning of the document are marked by a flag in its respective node index record.

Creation of OCR data from the image file record may be implemented in one of the computer workstations. The contents of a stage of the work queue are retrieved and forwarded to an OCR engine. The resulting OCR data can be appended to or linked with each node index file. OCR data file records are linked to the corresponding image file records by addresses contained in the node index file record.

The system provides a format bridge at one or more of the computer workstations. The format bridge will map the index records and related image file record to an input file of the retrieval device which will view or store the processed image file and a related image index record.

DESCRIPTION OF THE PREFERRED EMBODIMENT

Figure 1:
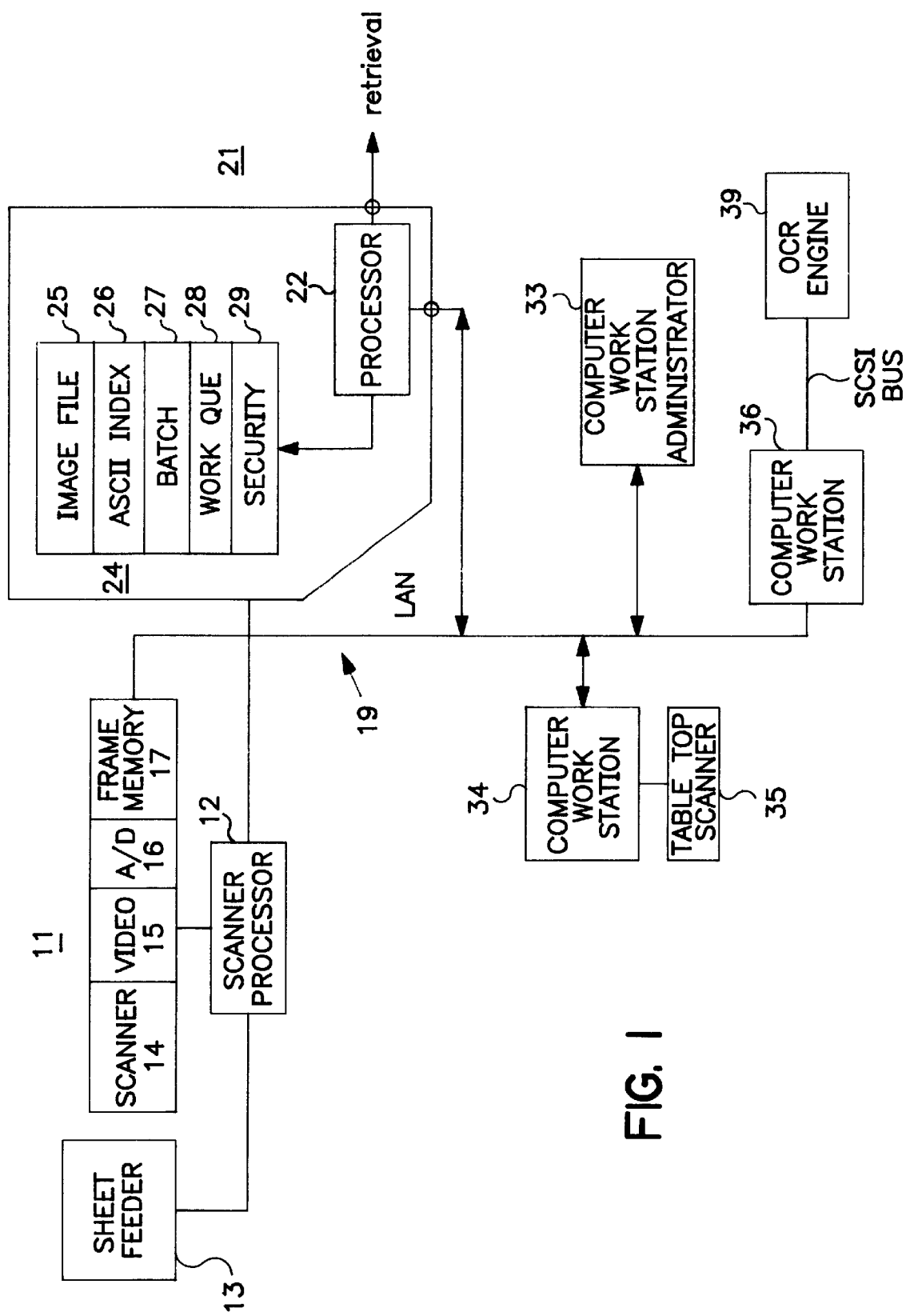
FIG. 1 illustrates the retrieval system for storing and retrieving scanned documents.

Referring now to FIG. 1, there is shown a system for scanning documents and creating electronic images of the documents. The system produces a video signal defining a plurality of discrete image pixels. A document scanner 11, under control of a scanner processor 12 scans each side of a page. The document scanner 11 and scanner processor 12 are connected to a local area network. The scanner processor 12 controls a sheet feeder 13, in synchronism with the scanner head 14 to image each side of a document.

The video signal from the scanner is amplified in amplifier 15. An analog to digital converter 16 digitizes the video signal to produce a frame of discrete pixels which are stored in the frame memory 17.

The scanned documents also include index indicia for identifying each document. This may be bar code data, Bates numbering, and also break pages inserted between documents, indicating, for instance, tile end of a document, the end of a file folder or the end of a box of file folders. Such separation sheets are recognized along with the other indicia on each image document and converted into all ASCII index file. The ASCII index file is shown more particularly in FIG. 2 wherein each row of the file corresponds to a single scanned image. The box number, file number, document number and address for each of the related image records in the image file is provided in the row. Thus, by consulting each row of the ASCII index file, it is possible to ascertain the location of a particular image.

Other data accompanying the row of addresses for each image record includes the aforementioned bar code, Bates numbering or other identification information.

The pixel-based images are stored as records in an image file 25 of a data base 24. The data base 24 is part of the processing system which includes a data base controller 22, each frame of pixels corresponding to a scanned document from the local area network 19, and storing the same in the image file 25. The ASCII index file created by the image scanner 11 is also stored in 26 of the data base 24.

The data base controller 22 is linked via the local area network 19 to computer work stations 33, 34 and 36. Each of the computer workstations runs an individual applications program which will access the ASCII index file and image file in data base 24 and display both an image record and a related ASCII to index file record.

In image retrieval systems which view the stored image files and related ASCII index file records, the quality of the stored image data and the amount of information contained in the ASCII to index file may be inadequate for many purposes. The image file may contain images which are a skewed, or of such poor quality that they are useless. In these instances, corrective measures have to be taken to remove the skew from the image or possibly rescan the entire document to obtain an image of sufficient quality.

The present invention permits the workstations 33, 34 and 36, as well as other workstations connected to the local area network, access to tile image files and ASCII index files. Additionally, a node index record is created for each image file record and, the node index records are organized as batches to facilitate distributed processing by each of the workstations 33, 34 and 36. The batch processing permits the new node index records and their related image record to be batched as jobs defined by the system administrator workstation. Each job defines a sequence of work tasks, executed by application programs running in workstations 33, 34 and 36. The batched node index records include information imported from the ASCII index file, the location of the related image file record, as well as information which can be entered manually by a workstations. In this way, the ASCII index file information is supplemented so that users of the image documents have additional information which is useful for searching and/or retrieval purposes.

The work queue 28 receives the node index records created from the batch operation and stores them in tile work queue which is organized in stages corresponding to a sequence of tasks to be carried out oln the image file records and node index records. In a typical image processing scenario, the first task might be to visually inspect each image and insert a flag in the linked node index record when an image is believed to be of substandard quality. The node index record may also be updated with manually inputted information as a first task.

As each image file record and the related index node record is processed, the node index record is returned to a lower stage of the work queue where it may be accessed by other computer workstations performing other tasks.

Image records are not modified by the workstations, but certain commands may be given from a workstation to the database controller 22 for eliminating skew, or effecting rotation of the image defined by an image record for a later task such as OCR.

Once all the tasks have been processed on each image file record and index node record, the index node records are returned to the lowest echelon of the work queue. A format bridge comprising an application program running in one of the workstations 33, 34 or 36 will access the last stage of the work queue and map the node index records to an input file of a retrieval device. The retrieval devices generally have proprietary formats for which various manufacturers publish specifications. The data fields from the node index records are mapped to the published input file specifications for these devices and transferred via a port 31 of the data base processor to a retrieval device operating in one of these formats.

A job is set up by the system administrator 33. The administrator application program runs in a windows operating system, and in response to a prompt from the system, the administrator operator enters information in accordance with Table 1.

TABLE 1

| Job ID | Priority | Work Flow |
| --- | --- | --- |
| Job 1 - Law Firm ABC | 1 | VQC, OCR, Format Bridge |
| Job 2 - Air Force | 3 | VQC, Format Bridge |
| Job 3 - Law Firm DEF | 2 | VQC, OCR, Format Bridge |

A window of the screen requests a job identification, a job priority and a work flow. The work flow identifies the processes to be carried out on each image file record and index node record related thereto of the defined job. As will be evident from the detailed description of the system administrator 33, batches are assigned to workstations in accordance with the job priority.

Figures 2, 3:
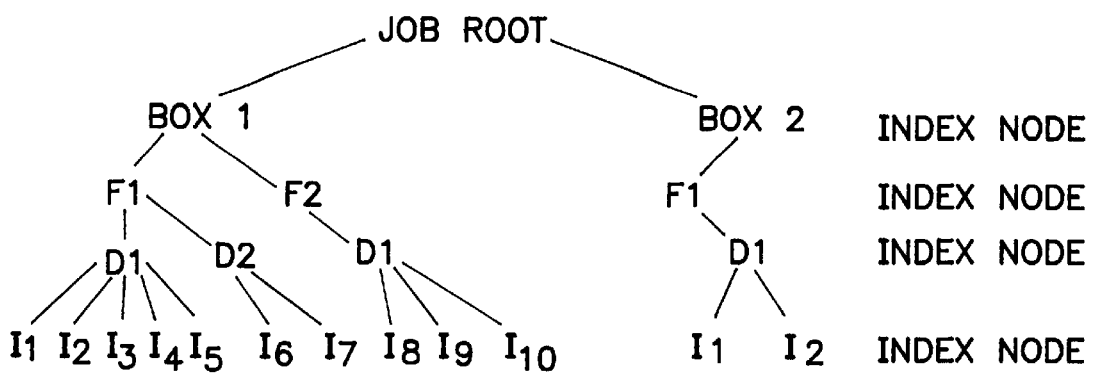
FIG. 2 illustrates the ASCII index file transferred by the image scanner to the data base 24 of FIG. 1.
FIG. 3 illustrates the process of creating job batches from the ASCII index file.

The creation of a batch defined by the job is illustrated in FIGS. 2 and 3. In the example shown, documents which have been scanned by the scanner system 11 originated from a box B. The document box is further divided by file folders F, and documents D within file folders. The lowest level of organization, individual images I of pages within a document, occupy a row in the ASCII file index of FIG. 2. Consulting each row of the ASCII file index, one call obtain the box B from which it came, the file folder F, the document D and the address of the corresponding image I in the image file.

A batch is created by going through the ASCII index file of FIG. 2, and creating a node index record for each level in the hierarchy of image, document, file folder and box. The node index record will contain pointers to the next level and to the preceding node index level of images representing a set and subset. Additionally, the administrator, as will be evident from the more detailed description, may create additional fields in the node index record for a workstation to enter useful data, such as author, title, Bates numbering, etc., which permits more effective retrieval and use of the images. In the case of the lowest level, the node index record also contains the address in the image record file of the specific image to which it pertains.

A job based oil boxes of documents scanned into the database 24 is shown in FIG. 3. Each row of the ASCII index file is checked to determine where a transition between levels exists. A node index record is created for each transition. The batch of node index records containing information assembled from the ASCII index file is stored in a work queue 28.

Figure 4:
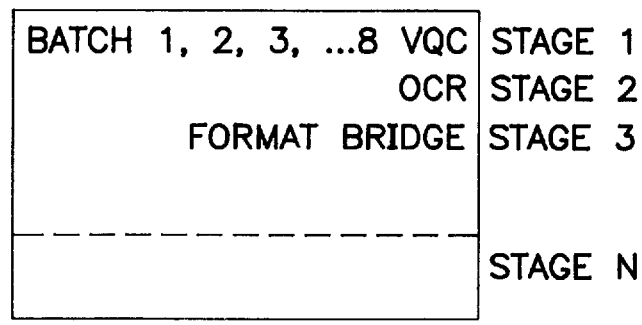
FIG. 4 illustrates the organization of the work queue.

FIG. 4 illustrates the work queue of the database divided into stages 1 through N. Stage 1 receives the batch of node index records for each job. The node index records in stage 1 are accessed by the computer workstations and a process which was defiled in the administrator window of Table 1, VQC (Visual Quality Control) is effected on the batch for job 1 by all stations, since this job has priority 1.

One of the workstations 33, 34 or 36 will include an application program to effect a process in the work flow identified ill the window of Table 1. Those stations logging into the database controller 22 will receive the node index record as well as the actual image file record for display when implementing the VQC process. Since job 1 has priority, all three computer workstations would receive batches from job 1 for the VQC task, assuring that each work status operation has been validated to work on job 1.

As each image file record is displayed with its corresponding node index record, the operator can input additional information in the additional fields created by the administrator in the node index record, as well as identify with an appropriate flag those index node records which pertain to an image which is skewed or requires rework. Once the VQC task is completed on an image file record and node index file record, the node index record is returned to stage 2 of the job queue.

Stage 2 of the work queue for job 1 having the highest priority includes node index record which had previously been subject to the VQC task. A workstation 36 running an application for doing the OCR task will retrieve those node index records which were previously subject to VQC from stage 2. Each of these records. and the linked image file record, is displayed at the workstation and the OCR function invoked. The image file record is transferred over a SCSI bus to an OCR engine. The OCR engine 39 creates a text file which is transferred back to the workstation 36 and may be linked to the node index record in a field designated at the time of administration to include such OCR data. The node index record is then returned to stage 3 of the work queue along with the linked OCR text file.

A computer workstation having an application program for performing the format bridge function will then retrieve from stage 3 of the work queue those index records which are to be mapped to the input file of a retrieval device. The image file records are linked to index node records which include information from the original ASCII index file, as well as manually-entered information and OCR linked information which may be useful in the retrieval process. Each of these fields of data is mapped by the format bridge to a corresponding data field of the retrieval input file. The format bridge may take the form of a simple translation table for translating the data fields of the input file of the retrieval device to the corresponding field of the node index file record.

The foregoing system permits distributed processing such that multiple jobs may be worked on by multiple stations, each station working on a batch having priority over other batches awaiting work flow tasks.

Figure 5:
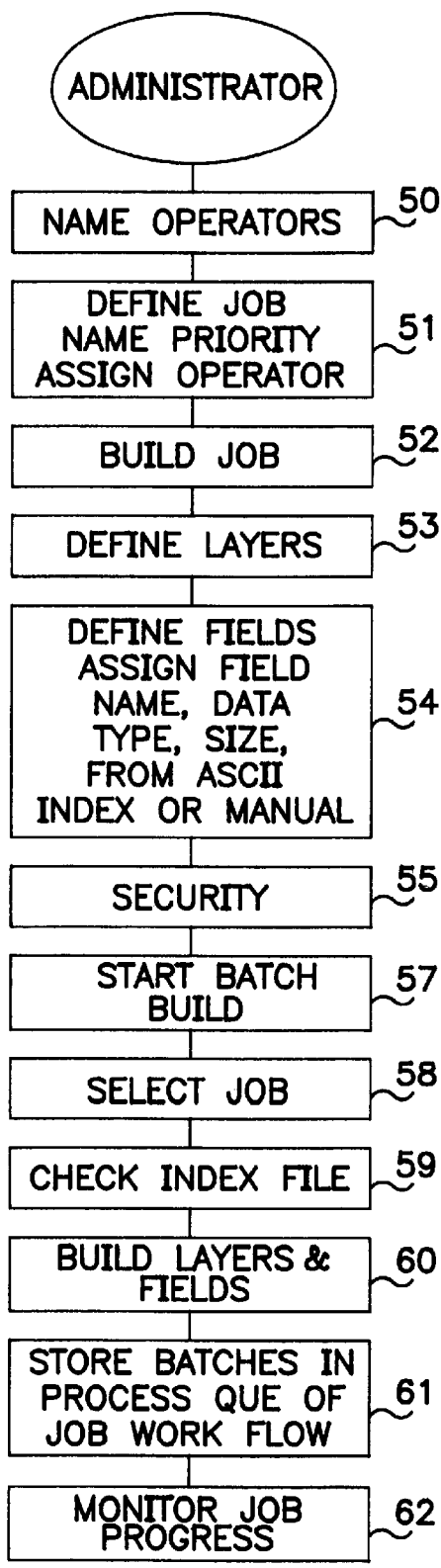
FIG. 5 is a flow chart illustrating the administrator batch function.

Turning now to FIG. 5, there is shown a flow chart which describes the operation of the administrator computer workstation which sets up each job and creates the batches for the jobs. The administrator, in step 50, establishes security for the distributed batch processing system. System operators who may use workstations 33, 34 and 36 are identified in step 50, and only those entities logging on who know their respective passwords will receive access to the work queue 28. The security information 50 is stored in the database at 29, and the database controller 22 will utilize that information to screen stations which log onto the network 19.

In step 51, the administrator, using a windows-based operating system, will identify the job(s) by name and priority. Further, the job definition process requires a list of the validated operators for each job. The job structure is then built to define the order of documents within a batch. A window prompts the administrator to define the various node layers of the job structure. In the example of FIG. 3, these layers included: box, folder, document and image. For each of the layers, a node record type is created which serves as a template in which the information from the ASCII 2 index file will be placed, as well as information manually entered by an operator that is performing one of the assigned tasks. These additional data fields are defined in step 54 by assigning a field name, a field data type, i.e., is it letters or numbers, the field size and whether the field is to be filled with data from the ASCII index file or manually entered by a workstation operator.

Having defined the structure of a batch, the system enters a security function in step 55 before building the batch. The security function includes the step of identifying the administrator by name and password, and determining whether or not the user is authorized to be an administrator.

Following the security clerk in step 55, the batch building process begins in step 57. One of the created jobs is selected in step 58 from a prompting window. In step 59, an algorithm is executed to determine from the ASCII index file transitions between layers representing the nodes of the structure.

Each row of the index file of FIG. 3 is checked, and the following steps executed:

(1) read one line from index file;
(2) set layer=top layer in job structure;
(3) examine data in line and determine if a new node for current layer is needed;
(4) if new node is not required. go to 8;
(5) create new node in database;
(6) create new nodes at all lower levels based on current data;
(7) go to 11;
(8) set layer to next lower layer;
(9) if layer is past image. go to 11;
(10) go to 3;
(11) go to 1.

This structure will build the node index records which correspond to each image in a job. The node index layers are linked by address fields to a respective image record in the image file.

The node index records of the database are constructed in accordance with FIG. 3 in step 60. At the end of tile batch building process the records are stored in the work queue at the first stage in a position relating to the job priority so that the work flow may progress in step 61.

In step 62, the administrator monitors the progress of the defined job. The administrator is notified of the completed batches on a window generated from the administrator operating system of computer workstation 33.

Figure 6:
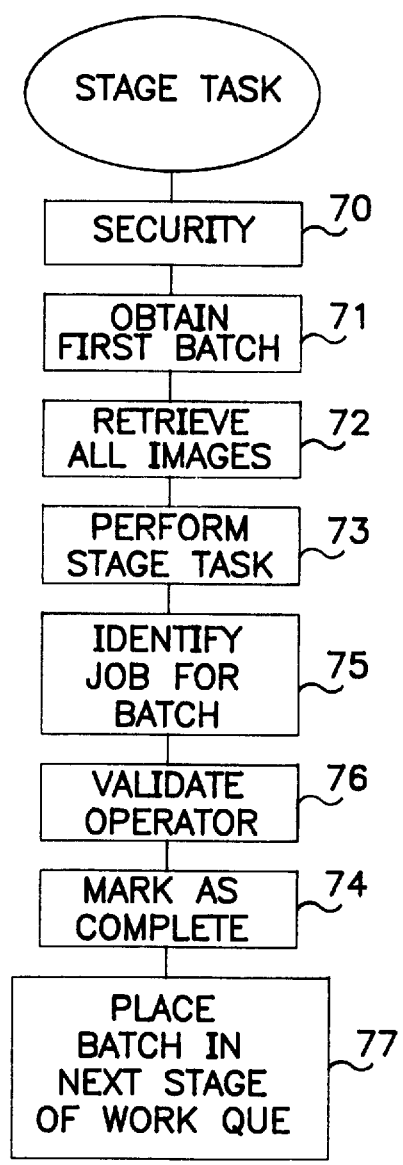
FIG. 6 illustrates a flow chart of the execution of a stage task by a computer workstation.

Having created the batches and stored them in the work queue 28, each of the computer workstation 33, 34 and 36 may access the work queue 28 and carry out the defined processes of the work flow. The process of executing a process task is illustrated more particularly in FIG. 6. A workstation logs on and goes through a security check in step 70. The security check begins when a window is generated by the application running in the workstation, requesting the identification of the operator. If the password and identity of the operator are acknowledged by the security information entered in the database 29, the batch controller 22 issues the first batch in the first stage of the work queue in step 71 to the workstation over LAN 19.

A subsequent window generated from the processing system requests the user to identify the job to the database controller. The database controller will validate the access of the operator to the job batch.

All of the images associated with the node index record of a batch are retrieved as each node index record is presented for inspection. The workstation superimposes the node index record over the image, permitting the operator to view both records.

The stage task is next performed, which might be a visual inspection, or it might be all OCR task wherein the contents of the displayed image are forwarded to an OCR engine for creating the OCR index file. When the task is completed for each image file record and corresponding index node record, the index node record is marked as complete by an appropriate flag set by the computer operator, in response to a window requesting the information.

Figure 7:
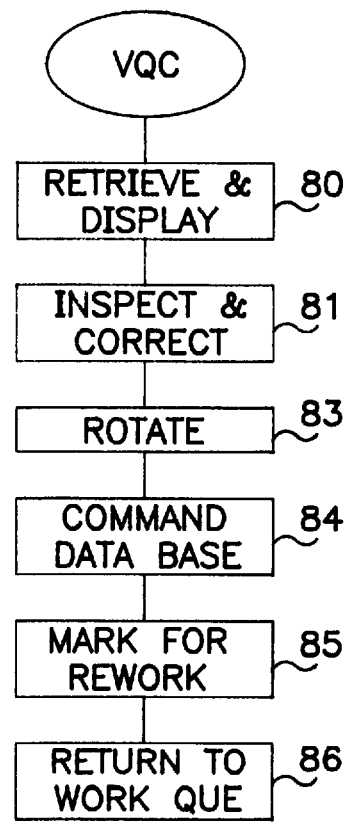
FIG. 7 is a flow chart of the visual quality control tasks executed by a computer workstation.
Figure 8:
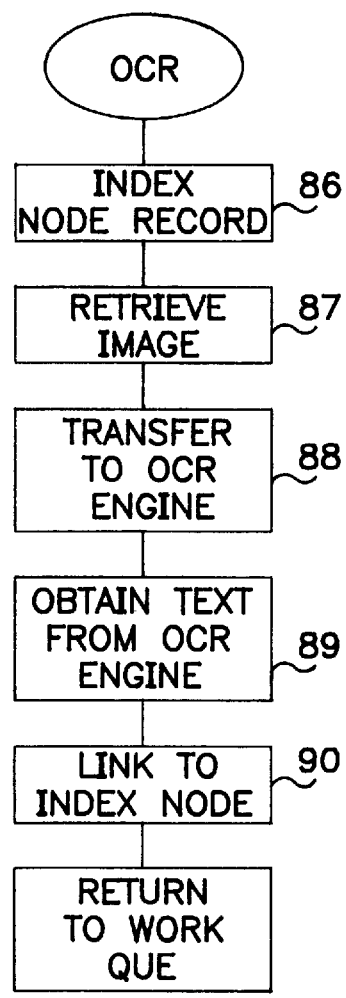
FIG. 8 is a flow chart of the optical character recognition process performed on image files.

As each image file record and index node record is processed, they are placed back into the database work queue in a location representing a subsequent process for executing in step 77. The specific task of visual quality control is shown ill FIG. 7. In this process, once the batch has been loaded from the work queue down to the workstation 34, each image file record is retrieved in sequence and displayed on the workstation computer display. The image is visually inspected in step 81 and in the event there is skew of the image, a flag may be set by the operator, indicating the image is to be rotated. The display function includes a command for locally rotating the image on the user's computer workstation display. This rotation then defines an angular rotation necessary to eliminate skew. A flag is set in step 83, the angular rotation inserted in a field of the index node record, and the index node record is returned to the batch queue at a stage dedicated for a subsequent process.

The flag set in the index node record is recognized in step 84 by the database controller, and the image is rotated in the image file memory according to the command which was written to the index node field, representing the measured image rotation.

Those displayed images which are of poor quality are marked by yet another flag set in step 83 by the operator in response to a window prompt. The flag identifies the index node record as requiring a rescan of the particular document image to which it pertains. A local tabletop scanner 35 may be provided for the workstation 34 of FIG. 1 to permit the rescan operation to occur for such identified documents.

Figure 9:
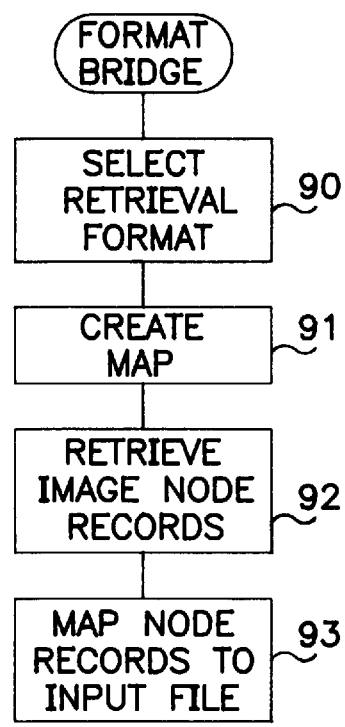
FIG. 9 is a flow chart of the format bridge which is used to map image node records to an input file of a retrieve device.

FIG. 9 represents an OCR task executed by one of the workstations. The OCR task begins by retrieving the index node records 86 from the stage of the work queue containing index records of images which are to be subject to the OCR process. Each of the related image records are retrieved and displayed sequentially in step 87. The image may be rotated 90° or transferred directly to an OCR engine in stage 88 over a local SCSI bus. The OCR engine 39 of FIG. 1 will create a text file from the received image data. The OCR text file is linked to the node index file in a specific field of the node index file which was set up by the administrator. The node index file and linked text file are transferred to the database from the workstation 36, and stored in a lower stage of the work queue.

Once the images have been processed in accordance with any number of image-processing schemes a requirement exists to provide an image output and index file output compatible with the retrieval devices currently in use. The manufacturers of the retrieval devices publish a format specification for an input file of the retrieval device. The input format is included in the software module running in one of the workstations referred to as a format bridge. The format bridge maps the fields of the node index to the respective fields of the input file of the retrieval device.

The image node records are retrieved in step 90, aid mapped to the input file fields in step 91. The retrieved image node records 92 are thereafter mapped to the input file of the retrieval device in step 93.

A file of mapping data may be provided for the format bridge so that any number of retrieval device formats may be selected from an appropriate window generated by the format bridge.

Thus, there has been described with respect to one embodiment an image retrieval system which will be described more particularly by the claims which follow.

What is claimed is:

1. A system for processing scanned images comprising:

a database controller for receiving frames of scanned image data representing said scanned images, and an index file identifying each frame;

a database for storing said scanned image data and index file;

a system administrator coupled to said database controller for defining a job and batch of images for said job, a batch comprising a plurality of node index records created from said index file, said node index records being linked to form a hierarchy representing sets and subsets of said image frames, each level of said hierarchy including a node index record identifying related sets and subsets of said images, the lowest of said levels having a node index record representing a stored image, and for storing said node index records in a work queue location corresponding to a process to be carried out on said related images; and, a plurality of computer workstations connected to said database, each computer workstation including an application program for retrieving a node index record from said work queue, and a related image frame from said database, each workstation having a processing capability for modifying said related node index record and placing said modified node index record in said work queue at a location related to a subsequent process, wherein another workstation can retrieve said modified node index record and perform a subsequent process.

2. The system according to claim 1 wherein said work queue locations are partitioned to correspond to a first batch of images which are to be visually inspected along with a related index node record which is to be marked with a flag when said images are determined to be of substandard quality, and are partitioned to correspond to a second batch of images which are to be subjected to optical character recognition.

3. The system according to claim 2, wherein one of said workstations contains a format bridge which maps data contained in said related index node record to a retrieval device input file.

4. The system according to claim 1, wherein said system administrator assigns an operator to each job, and said database controller limits access to images and related records to said operator.

5. A system for performing multiple processes on scanned images simultaneously comprising:

a database controller for receiving frames of scanned image data and an index file identifying each scanned image;

a database for storing said scanned image data and index file;

a system administrator connected to said database controller, said system administrator defining a batch of linked records corresponding to each scanned image which is to be processed as a job, and storing said linked records in a first stage of a work queue;

a plurality of computer workstations connected to said database controller, a first of said workstations being programmed to retrieve and display said linked records and related images on said workstations, said workstation modifying said linked records and storing said linked records in a second stage of said database work queue;

a second computer workstation programmed to retrieve said linked records in said second stage of said database work queue and performing a second process on said linked records, and storing said linked records following said second process in a third stage of said database work queue; and a third computer workstation connected to said database controller for retrieving data from records in said third stage of said database work queue, and being programmed to map said data to a retrieval device input file.

6. The system of claim 5, wherein said administrator defines for each process an operator identity, and supplies said identity to said database controller which restricts transfers of said linked records to said operator.

7. The system of claim 5, wherein said administrator defines multiple jobs of different priorities, and stores batches of linked records relating to said jobs in a position in said work queue relating to said priorities.

8. The system of claim 7, wherein said first workstation retrieves said batches of linked records on the basis of said priority.

9. The system according to claim 5, wherein said first computer workstation visually inspects each image in a batch contained in said first stage, and marks each related record of an image which is of poor quality with a flag indicating said image is to be reworked.

10. The system according to claim 5, wherein said first computer workstation manually adds information to said linked record, further identifying a related image.

11. The system of claim 5, wherein said first computer workstation issues a command to said database controller to correct for image skew of a displayed image.

* * * * *